United States Patent
Westroos et al.

(10) Patent No.: US 6,327,472 B1
(45) Date of Patent: Dec. 4, 2001

(54) ARRANGEMENT, SYSTEM AND METHOD RELATING RADIO COMMUNICATION

(75) Inventors: Anders Westroos; Peter Östrup; Nina Kopp, all of Linköping; Simon Eneland, Mjölby; Hanna Ekstam, Linköping, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/438,726

(22) Filed: Nov. 11, 1999

(30) Foreign Application Priority Data

Nov. 11, 1998 (SE) .................................................... 9803855

(51) Int. Cl.$^7$ ..................................................... H04Q 7/20
(52) U.S. Cl. ........................... 455/450; 455/453; 455/436
(58) Field of Search ................................... 455/440, 441, 455/453, 443, 450, 436, 437, 438, 439, 452, 422

(56) References Cited

U.S. PATENT DOCUMENTS

| | | |
|---|---|---|
| 5,241,685 | 8/1993 | Bodin et al. . |
| 5,475,868 * | 12/1995 | Duque-Anton et al. ............... 455/62 |
| 5,859,899 * | 1/1999 | Sakai et al. ......................... 379/92.01 |
| 5,903,840 * | 5/1999 | Bertacchi ............................... 455/436 |
| 5,903,843 * | 5/1999 | Suzuki et al. .......................... 455/452 |
| 5,926,469 * | 7/1999 | Norstedt et al. ...................... 370/329 |
| 5,940,743 * | 8/1999 | Sunay et al. ............................. 455/69 |
| 5,940,763 * | 8/1999 | Alperovich et al. .................. 455/450 |
| 6,041,238 * | 3/2000 | Tanoue .................................. 455/452 |
| 6,178,164 * | 1/2001 | Wang et al. ........................... 370/331 |

FOREIGN PATENT DOCUMENTS

| | | |
|---|---|---|
| 2315386 | 1/1998 | (GB) . |
| 9535007 | 12/1995 | (WO) . |
| 9823115 | 5/1998 | (WO) . |

* cited by examiner

*Primary Examiner*—William Trost
*Assistant Examiner*—Congvan Tran
(74) *Attorney, Agent, or Firm*—Burns, Doane, Swecker & Mathis, L.L.P.

(57) ABSTRACT

A radio network handling arrangement handles radio communication in a number of cells in a cellular communication network. The radio network handling arrangement includes a device for assignment of traffic channels and parameter for storing cell parameter information. Signal strength information holding devices are also provided. The arrangement further includes load monitors for holding information about the traffic load in at least a number of cells. The traffic assignment device includes a device for using information about cell parameters and about signal strength measurements for a number of cells to establish if there are any neighboring cells available as cell candidates for a mobile station accessing an access cell. The traffic load information relating to the access cell and such available cells is used in such a way that a load dependent assignment can be performed for a mobile station accessing an access cell.

19 Claims, 6 Drawing Sheets

FIG. 6

ARRANGEMENT, SYSTEM AND METHOD RELATING RADIO COMMUNICATION

This application claims priority under 35 U.S.C. §§119 and/or 365 to Application No. 9803855-7 filed in Sweden on Nov. 11, 1998; the entire content of which is hereby incorporated by reference.

The present invention relates a radio network handling arrangement handling radio communication in a number of cells and serving a number of mobile stations in a cellular communications network which comprises means for assignment of traffic channels. The invention al so relates to a cellular communication system including a number of radio network handling arrangements. Still further the invention relates to a method of assigning a traffic channel to a mobile station accessing a cell in a cellular communication system including a number of radio network handling arrangements.

BACKGROUND

At call set-up, a mobile station is assigned a traffic channel which means that a mobile station is actually moved from a control channel to a traffic channel. Generally a mobile station is always assigned a traffic channel in the same cell as the control channel except when a cell fulfilling some given network requirements (in a hierarchical cell structure) exists or when there is traffic channel congestion in the cell in which the mobile station is connected to a control channel. A hierarchical cell structure is often used to gain capacity in a mobile radio network in a hierarchical cell structure cells of different sizes will cover one and the same geographical area and the advantage thereof is that frequencies can be reused with a closer reuse pattern.

When a mobile station is in an idle mode, it performs measurements on all control channels ( in the PDC (Personal Digital Cellular) system the control channels are denoted perch channels) in the area in which it is located or within the relevant location area. The control channel having the highest signal strength is chosen and it belongs to the cell that the mobile station will use at call set-up, also called the access cell. The mobile station then listens to broadcasting information sent out in a broadcasting information message on the selected control channel. The broadcasting information message among other information contains information about the number of reporting zones at call set-up. This information is thus (together with other information) received by the mobile station. The mobile station will then send signal strength information and control channel number, using the idle state measurements, to the system at call set-up for as many neighbouring cells as the information relating to the number of reporting zones has specified. In for example one implementation of the PDC-system two neighbouring cells are specified but the PDC standard as such e.g. allows twenty neighbouring cells to be specified.

When there is a high traffic load in a cell so called cell load sharing may be implemented. This means that the cell borders are moved through changing the handover offset parameter that is defined for a cell-neighbouring cell relation. Then mobile stations which are connected to a traffic channel in the cell having a high traffic load are made to perform a handover to the neighbouring cell which has a lower traffic load.

U.S. Pat. No. 5,241,685 relates to the provision of load balancing through mechanically moving the borders between any two cells such that an overloaded cell becomes smaller whereas the neighbouring cell becomes larger. According to this document this is achieved through lowering the entering signal strength threshold for handover to the neighbouring cell and/or increasing the entering signal strengh threshold for handover from the neighbouring cells, wherein the thresholds are unique for any two cells.

Assignment to a neighbouring cell is only activated when congestion occurs in a cell. However, when there is a request for a resource (i.e. a traffic channel) for a new call in a cell which is congested, the requirements for assignment to a neighbouring cell, might not be fulfilled. These requirements are based on (handover) parameters determining whether a mobile station is within the handover area between cells or not. Thus, if these requirements are not fulfilled such calls will be disconnected. Thus, congestion situations easily arise leading to the disconnection of calls. This is a serious drawback. Consequently an assignment to an assignment candidate forming an alternative to the access cell is only performed if there are no more resources in the access cell, in other words, there is congestion. The probability that a mobile station requesting resources in a congested cell is located in the handover area between two cells is quite low which means that the probability that the call be dropped is high.

SUMMARY OF THE INVENTION

What is needed is therefore a radio network handling arrangement in a cellular communication system enabling an efficient way of assigning traffic channels and through which the risk of loosing calls due to congestion in a cell is reduced. An arrangement is also needed through which the traffic load throughout the cells can be evened out. Moreover an arrangement is needed through which more calls can be accepted before a congestion situation arises.

A cellular communication system including a number of radio network handling arrangements is also needed in which the above mentioned objects are achieved.

Still further a method of allocating a traffic channel to a mobile station in a cellular communication system is needed through which the traffic load can be evened out among the cells. Still further a method is needed through which the risk of loosing calls can be reduced and through which more calls can be accepted before a congestion situation arises.

Therefore a radio network handling arrangement handling radio communication in a number of cells in a cellular communication network is provided, which comprises a number of radio channels assigned as control channels and traffic channels, means for assignment of traffic channels and parameter storing means for storing cell parameter information. Information holding or collecting means are also provided for holding/collecting information about signal strength measurements. The arrangement further comprises load monitoring means for holding information about the traffic load in at least a number of cells and the traffic assignment means comprises means for using information about cell parameters and about signal strength measurements for a number of cells to establish whether there are any neighbouring cells available as cell candidates for a mobile station accessing an access cell. The traffic load in the access cell and said available cells respectively is used in such a way that assignment can be performed taking the load situation into account, here also called load dependent assignment, for a mobile station accessing an access cell. Particularly signal strength values and cell parameters are used to establish whether there are any neighbouring cells available as candidates for a mobile station accessing an access cell using cell load considerations and to establish which such neighbouring cells are. In a particular implementation the cell parameters are handover parameters which are added, and/or subtracted from the signal strength values which are received from the mobile station in an initial access message provided to the access cell, to establish whether the mobile station is in the handover area between the access cell and at least one neighbouring cell in which case said neighbouring cell or cells forms(form) one or more available cell candidates or alternatives to the access cell. The offset parameter (OFFSET) is one such handover parameter and it is used to move the cell border in a cell-neighbouring cell relationship. This is particularly done in such a way that the offset value (in dB) either is subtracted or added to the signal strength value as reported by a mobile station. The handover parameter HYST (also in dB) is used in order to avoid oscillating handovers between cells in a cell-neigbouring cell relationship. The HYST parameter is mutually defined in the relationship which means that mobile stations that move from for example a cell A to a cell B, will add the HYST value to the signal strength value of cell A and compare this new value with the measured signal strength value of cell B. If the signal strength is higher in cell B as compared to cell A (signal strength+HYST), a handover will be attempted. Of course the handover parameters merely constitute an example. Other parameters can also be used; established parameters or parameters created for the purpose of performing assignments depending on the load situation.

Particularly, if a mobile station is found to be in the handover area of a number of alternative neighbouring cells, traffic load information contained in the load information holding means is used to establish which of the cells, i.e. the access cell or any of the available neighbouring cells, has the lowest traffic load in which case the mobile station is assigned a traffic channel in that cell. Instead of being contained in the load information holding means, traffic load information can be fetched or provided on demand in any appropriate way. Traffic load information can be provided in different ways. It can be based on the actual load in the cells or it can be based on an estimation of which would be the load if an assignment would be performed to a particular cell etc. This of course is applicable irrespectively of whether handover parameters or other parameters are used.

In a particular embodiment a threshold value is given for the load in at least the alternative neighbouring cells and if the traffic load exceeds the threshold value in the access cell, the mobile station is assigned a traffic channel in an available neighbouring cell having a traffic load which is lower than the threshold value of the cell, if the mobile station is within the area allowing load dependent assignment, particularly the so called handover area.

The invention is applicable to substantially any cellular communication system, of which some examples are PDC (Personal Digital Cellular), ADC (American Digital Cellular), GSM (Global System for Mobile Communications). In a particular implementation for example relating to PDC or ADC, the arrangement is comprised in a mobile switching center (MSC) of the communication network. The parameter storing means and/or load monitoring means may be arranged in the arrangement itself, i.e. in the mobile switching center, or both of them may be arranged separately or externally of the MSC but communicating therewith and associated with it. In the case of the GSM-system the arrangement may be comprised by a base station controller (BSC). Also in this case the parameter storing means and/or the load monitoring means may be arranged in the BSC or alternatively either of them may be arranged externally thereof but in communication with it.

In a particular implementation of the invention the cells are arranged in a hierarchical cell structure. The load based assignment to a neighbouring cell is advantageously performed to provide for set-up of calls in the lowest possible hierarchical layer and if a mobile station is within the coverage of lower as well as of higher layer cells, traffic load information is fetched for both lower and higher layer cells. Of course the provision of traffic load information can be provided for in any convenient manner.

In a particular embodiment load controlled or load dependent assignment is implemented only for cells within the coverage area of one and the same MSC or BSC respectively. In an alternative or more particularly in an advantageous embodiment, load dependent assignment is implemented for cells irrespectively of whether the cells belong to the same or different MSCs or BSCs respectively. This however, presupposes some signalling between the respective MSCs or BSCs respectively. In an even more particular implementation of load dependent assignment for cells belonging to different MSCs etc. another factor may also be taken into account, namely the processor load in the respective MSCs. An example thereon is e.g. if the traffic load of a cell belonging to an MSC is low, but the processor load in said MSC is high, there may be no reason to perform an assignment to such a cell.

The traffic load of a cell can be defined in a number of different ways. In a particular implementation the traffic load of a cell is defined as the number of busy traffic channels divided by the sum of the number of busy traffic channels and idle traffic channels in the cell. Particularly the traffic load is evaluated at every allocation attempt in the cell. Advantageously the traffic load in at least a number of cells, or particularly all cells, is measured continuously. Traffic load "measurements" may take the form of actual measurements of the traffic load in the cells but they may also take the form of estimations of which the load in a cell would be if a mobile station were allocated a traffic channel in said cell which particularly takes into account the relative importance of a resource in different cells.

U.S. patent application Ser. No. 09/019 897 filed on Feb. 6, 1998 and which herewith is incorporated herein by reference, relates to a system for assigning traffic channels to mobile terminals requesting resources wherein each cell is assigned a predetermined high traffic threshold value. The threshold value can according to said document for example be defined as an absolute number of channels in use or the number of channels used to the total number of channels provided in the cells etc. In a particular embodiment the threshold values in the cells of the present invention can be defined in the same manner as in this document.

Moreover a cellular communication system is provided which includes a number of radio network handling arrangements, each handling radio communication in a number of cells and comprising radio channels assigned as control channels and traffic channels. Each arrangement, or at least a number of arrangements in which the inventive concept is to be implemented, include means for assignment of traffic channels and parameter storing means for storing cell parameter information. At least a number of said arrangements further comprise load monitoring means for collecting information relating to the traffic load in at least a number of the cells served by the respective arrangements and traffic assignment means comprising means using said parameter information and signal strength information to establish if there are any neighbouring cells available as cell candidates for a mobile station accessing an access cell, and if it is established that a number of neighbouring cells are available as cell candidates, traffic load information is used in such a way that load dependent assignment of a traffic channel can be performed for a mobile station accessing an access cell. Particularly in the parameter storing means at least information about parameters is stored for determining whether cells are available as handover candidates and information holding means are provided for holding information about the signal strength in a number of cells.

The signal strength values and the cell parameters, in a particular embodiment handover parameter, are used to establish whether there are any neighbouring cells available for a mobile station accessing an access cell and, if there are such cells, to establish which they are. Particularly a mobile station accessing an access cell provides an initial message to said access cell and signal strength information is provided in said initial message. The (handover) parameters are added and/or subtracted from the signal strength values to establish whether the mobile station is in the handover area between the access cell and at least one neighbouring cell.

If a mobile station is in the handover area of a number of alternative neighbouring cells, or if cells are available as available candidates using other criteria, traffic load information is used to establish which of the cells, among the access cell and any available neighbouring cell, has the lowest traffic load and the traffic assignment means of the relevant network handling arrangement assigns a traffic channel in such cell to the mobile station. In a particular implementation a threshold value is given for the load in a number of cells. If the traffic load exceeds, or would exceed, the threshold value given for the access cell, the mobile station is assigned a traffic channel in an available neighbouring cell having a traffic load that is lower than the respective threshold value of such cell. Individual threshold values may be given for the respective cells but the threshold value may also be the same for a number of cells. As referred to earlier the network handling arrangements may comprise mobile switching centers or base station controllers and the parameter storing means as well as the load monitoring means may be arranged separately but in communication with a respective radio network handling arrangement or either or both thereof may be provided in the respective radio network handling arrangement.

If assignment to cells of different MSCs is allowed may in a particular implementation the processor load in the respective MSCs be considered. Particulary the cells are arranged in a hierarchical cell structure.

To achieve the aforementioned objects a method of assigning a traffic channel to a mobile station accessing a cell in a cellular communication system inlcuding a number of radio network handling arrangements is also provided. The method comprises the steps of; receiving a call set-up message including an initial access message in a cell which thus forms the access cell; examining whether there are any neighbouring cells available for setting up the call using information about cell parameters; if yes, using traffic load information to perform a load dependent assignment of a traffic channel in one of the access cell and said available neighbouring cells respectively, to the mobile station. Particularly the method further includes the steps of examining the traffic load in the access cell and all available neighbouring cells; examining if the traffic load is lower in any of the neighbouring cells that are available than in the access cell, and if yes, allocating a traffic channel in such neighbouring cell to the mobile station, otherwise allocating a traffic channel in the access cell (as long as it is not congested).

In an advantageous implementation the method further includes the steps of introducing a threshold value for the traffic load for a number of cells; examining whether said threshold value is exceeded for the access cell; if yes, examining whether the traffic load is lower than the respective threshold value in any of the available neighbouring cells, if yes, allocating a traffic channel in such neighbouring cell. In an advantageous implementation individual threshold values are given for each of a number of cells or each cell. Alternatively threshold values may be given for the relation between a cell and a particular neighbouring cell. Other alternatives are also possible. Particularly the method includes the steps of sending signal strength value measurement reports from the mobile station to the radio network handling arrangement and using said signal strength values and the handover parameters to establish whether there are any available neighbouring cells.

BRIEF DESCRIPTION OF THE DRAWINGS

The invention will in the following be further described in a non-limiting way and with reference to the accompanying drawings, in which.

DETAILED DESCRIPTION

Figure 1:
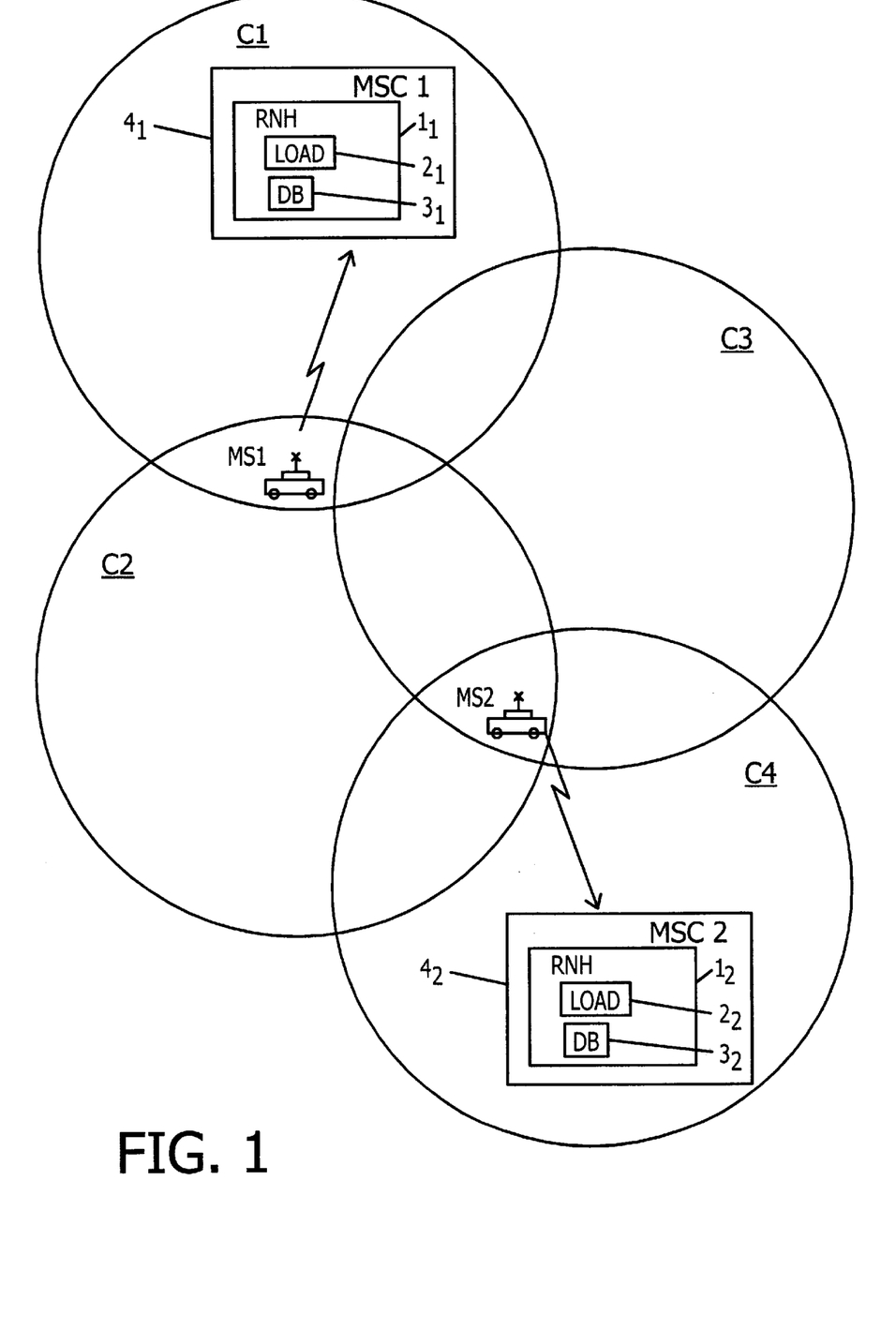
FIG. 1 very schematically illustrates radio network handling arrangements in a cellular system according to one embodiment of the present invention, FIG. 2 very schematically illustrates a radio network handling arrangement in a cellular system according to another embodiment of the present invention, FIG. 3 schematically illustrates a mobile station in the handover area between two cells.

FIG. 1 relates to an embodiment allowing load dependent assignment between cells controlled by different MSCs (c.f. different BSCs) It should also be clear that, as is well known in the art, each cell is controlled by an MSC; each MSC thus controls a number of cells. In this embodiment it is e.g. supposed that MSC 1 controls among others cells C1 and C2. Whereas MSC 2 controls C3 and C4.

In FIG. 1 a first radio network handling arrangement $1_1$ is illustrated which here is located in e.g. a cell C1. The radio network handling arrangement, in the following denoted RNH $1_1$, is here supposed to be provided in a mobile switching center MSC $4_1$ and the RNH $1_1$ is here illustrated as containing load monitoring means $2_1$ and a database for holding cell parameter information $3_1$. Thus, in this embodiment load monitoring means $2_1$ and parameter storing means $3_1$ are both arranged in MSC $4_1$ or alternatively the RNH $1_1$ can be said to use e.g. the parameter storing means of the MSC.

In cell C4 a second RNH $1_2$ is provided which is arranged in the mobile switching center MSC $4_2$. Also for the RNH $1_2$ the load monitoring means $2_2$ and the parameter storing means (database) $3_2$ are provided in the MSC itself. Of the cellular system are merely cells C1, C2, C3 and C4 illustrated for reasons of simplicity. In this simplified illustration the overlapping areas between cells are taken to mean the area permitting load dependent assignment or particularly a handover area which means the area in which a handover is allowed to either of the cells if a mobile station is located therein. Thus, in FIG. 1 MS1 is supposed to be in the handover area between cells C1 and C2 whereas MS2 is supposed to be in the handover area between cells C2, C3 and C4. As referred to earlier in the application, when a mobile station is in an idle mode, it makes measurements on all the control channels in the area in which it is located and the control channel having the highest signal strength is chosen. Signal strength measurements are performed by the respective mobile stations and provided to the MSCs (in this case). The control channel with the highest signal strength value is selected and it will be in the access cell, i.e. the cell that the mobile station would use at call set-up. A broadcasting information message is sent out on the selected control channel and, in this message, the mobile station receives among others information about the number of reporting zones at call set-up. This means that the mobile station will send signal strength reports and control channel number from the idle state measurements to the system at call set-up for as many neighbouring cells as has been specified through the information number of reporting zones. Thus at originating as well as terminating call set-up the mobile stations, here MS1 and MS2 respectively, send signal strength value measurement for as many neighbouring cells as specified by the number of reporting zone information (air interface, RT, messages Terminating and Originating Condition Report). According to the present invention will thus information provided in MSC 1 and MSC 2 be used at assignment of a traffic channel. If MS1 and MS2 respectively are in the handover areas between two or more cells, according to one implementation of the invention, a traffic channel will be assigned to the mobile station in the least loaded cell. In the embodiment as illustrated in FIG. 1 MS1 is supposed to be in the handover area between cells C1 and C2 whereas MS2 is supposed to be in the handover area between cells C2, C3 and C4. If a mobile station is in the handover area between a number of cells, in this particular embodiment is supposed to be given by whether the mobile station is within the range of the handover parameters HYST and OFFSET respectively which will be further explained with reference to FIG. 3.

According to the invention parameters are used to decide whether a mobile station is within the area allowing load dependent assignment, which particularly may correspond to the handover area, or not. E.g. the handover parameters HYST, OFFSET may be used. They are then fetched from the radio network parameter database $3_1$ in MSC 1 for MS1 and from the parameter storing means DB $3_2$ in MSC 2 for MS2 respectively. The (handover) parameters will then be added or subtracted, depending on which is the (handover) parameter, from the signal strength values received from the mobile station in the initial access message provided to the respective RNH.

Since MS 1 is found to be located in the handover area between the access cell (here C1) and cell C2, which thus forms an available neighbouring cell or assignment candidate, the traffic load in the access cell C1 and the traffic load in available neighbouring cell C2 will be fetched from the load monitoring means $2_1$ provided in MSC 1. The traffic load can be defined in many ways and the invention is not limited to any particular way of defining or estimating traffic load. However, one example on definition of traffic load will be further described with reference to FIG. 3.

MS1 will then be assigned a traffic channel in access cell C1 or available neighbouring cell C2 depending on what the evaluations in the load monitoring means $2_1$ show, here which cell of cells C1 and C2 respectively that has or would get the lowest traffic load. If for example the traffic load in C2 is found to be lower than the traffic load in C1, MS1 is assigned a traffic channel in C2 instead of in C1 which was the access cell. The situation is similar for MS2 but MS2 in the illustrated embodiment is supposed to be in the handover area between cells C2, C3 and C4 wherein C4 forms the access cell. The traffic load in cells C2, C3 and C4 is thus compared using the information in load monitoring means 32, particularly using processing means provided in the radio network handling arrangement RNH $1_2$. For example in this case it is supposed that the load is lowest in cell C3 (or will be the lowest, if an estimation is done as discussed earlier in the application) and MS2 will thus be assigned a traffic channel in cell C3.

In an alternative embodiment, in addition to the traffic load, the processor load may in the MSCs be considered to decide whether assignment to a cell of another MSC be performed or not. This information can be collected in different ways and the information can also be used in different ways. For example it can be used in such a way that if the processor load of a particular cell is high, it might not be worth while performing such an assignment to such a cell.

Figure 2:
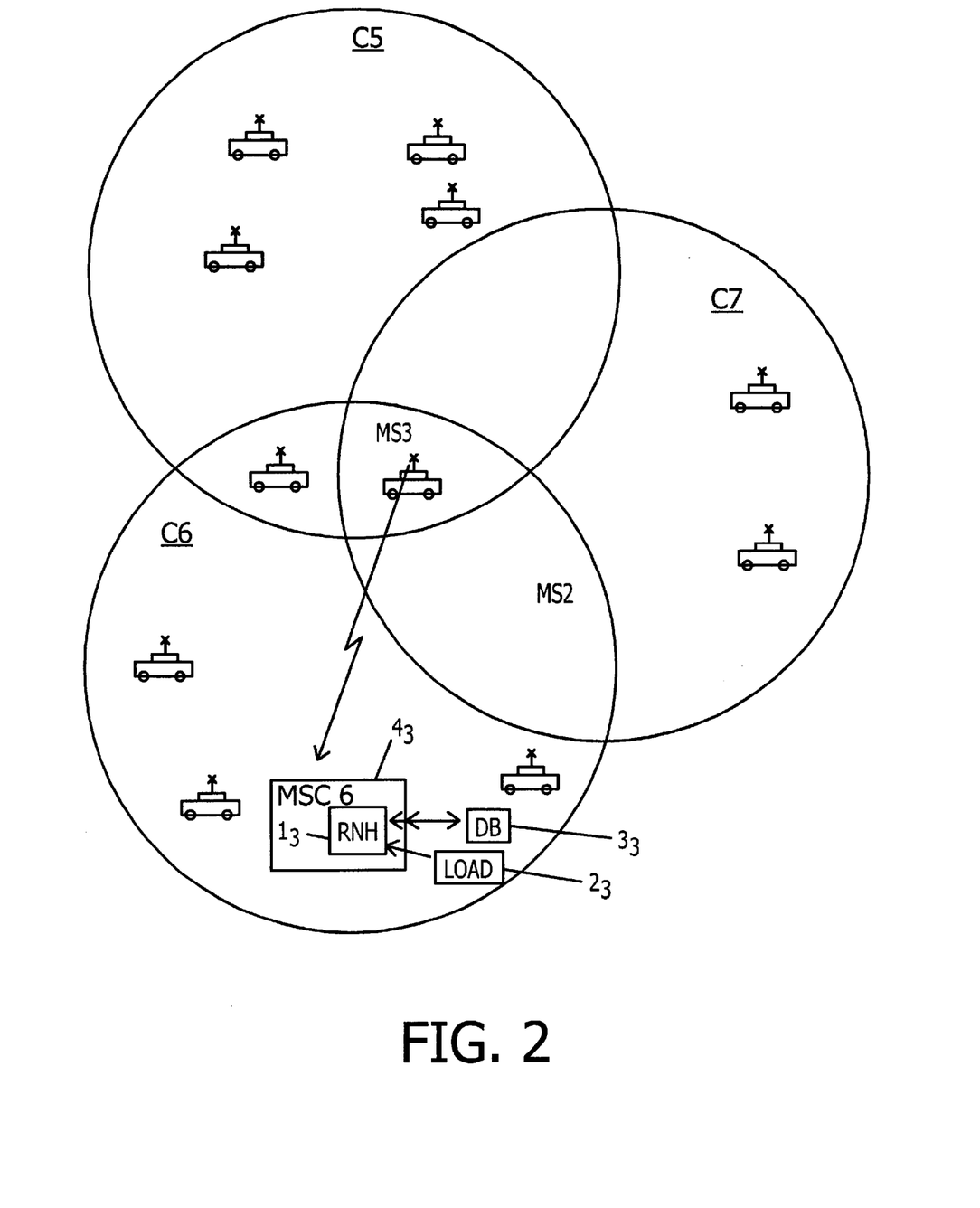

In FIG. 2 an embodiment is illustrated which relates to load dependent assignment between cells controlled by one and the same MSC. A radio network handling arrangement RNH $1_3$ is here provided in a mobile switching center MSC 6 $4_3$. However, in this embodiment it is supposed that the parameter storing means DB $3_3$ are arranged externally of the MSC but associated with and in communication therewith (and with RNH $1_3$). In this embodiment it is also supposed that the load monitoring means $2_3$ are provided externally of the MSC but in association therewith and communicating with the RNH $1_3$. Of course DB $3_3$ could have been provided in the MSC $4_3$ or alternatively the load monitoring means $2_3$ could have been provided in the MSC $4_3$; or both could have used the functionality provided by the MSC. FIG. 2 is just an example on a particular implementation. Three cells C5, C6 and C7 are illustrated and a mobile station MS3 is supposed to be in the handover area of said three cells. Cells C5, C6 and C7 are thus all controlled by MSC 6 (as other cells which are not shown as well). Cell C5 is supposed to form the access cell but using load information provided in the load monitor $2_3$ it is established that the traffic load is lowest in cell C7 and therefore MS 3 is assigned a traffic channel in cell C7. (This illustration presupposes that the capacity is the same in C5, C6 and C7. This is however mostly not the case.)

Processing means, in which an algorithm for a load based assignment is provided and load monitoring means (particularly measuring the load in a cell continuously), are supposed, in a particular embodiment, to be located in the radio network part of the system, in FIGS. 1 and 2 in the MSC.

It should however be clear, although FIGS. 1 and 2, which are exemplifying embodiments, merely show MSCs, that in another kind of communication system it could likewise have been BSC:s (for example in the GSM-system).

In a particular embodiment a so called hierarchical cell structure is used and in such an environment, the assignment to a neighbouring cell is used to set-up calls in the lowest possible layer (in a particular embodiment). For doing so, other cell parameters are used (SSUFF and HYSUFF). This could in an advantageous implementation also be made load based but then changes are needed in the handover functionality. Before handover is done to a lower layer cell, an evaluation has to be performed to establish whether the mobile station is within the coverage area of both the higher layer and the lower layer cells. If so, the load for both cells are fetched from the load monitor of the MSC and the call is kept in, or handed over to, the cell having the lowest load. Alternatively other criteria can be used, also e.g. in addition thereto; e.g. it may in some cases be more interesting to use a cell which is not in the lowest layer, or to use a cell in the lowest layer even if the load is higher etc.

In the embodiment illustrated above, only assignments to a neighbouring cell controlled by one and the same MSC as the access cell is illustrated. However, in other embodiments, assignments may also be done to neighbouring cells controlled by another MSC as described in FIG. 1. To enable that, information about the traffic load in such border cells has to be sent to said other, cooperating MSC. This requires updates of today used interface protocols to support the signalling between the MSCs.

Figure 3:
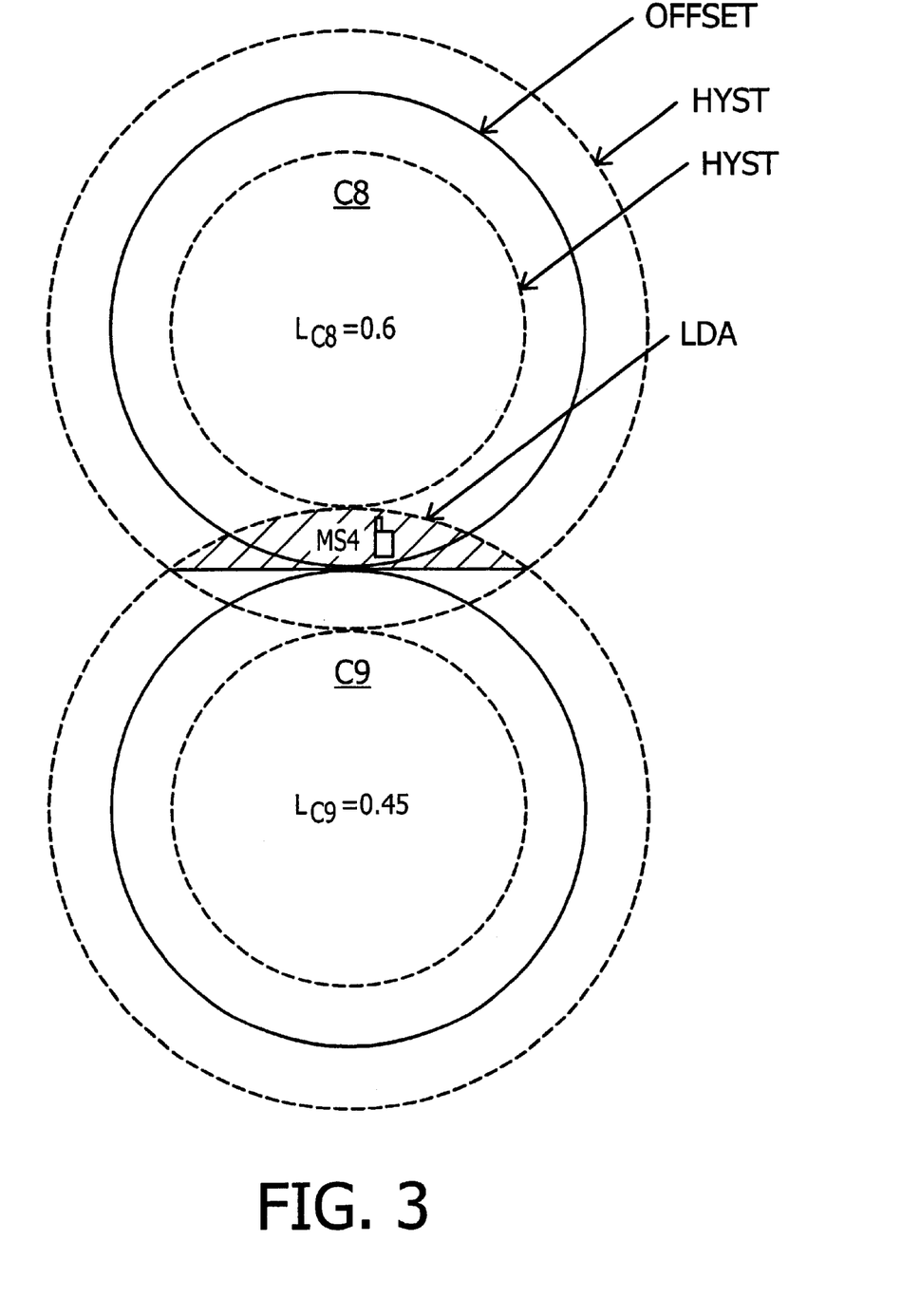

In FIG. 3 two cells C8 and C9 are illustrated with their respective handover values, the OFFSET and HYST values, respectively indicated. One mobile station MS4 is also illustrated. As referred to earlier, the OFFSET parameter is used to move the cell border in a cell-neighbouring cell relationship and it is done in such a way that the OFFSET value (measured in dB) is either subtracted or added to the signal strength as reported by the mobile station.

The HYST value (also measured in dB) is used to avoid oscillating handovers between cells in a cell-neighbouring cell relationship. The HYST parameter is mutually defined in the relationship, i.e. mobile stations moving from, in this case, cell C8 to cell C9, will add the HYST value to the signal strength of cell C8 and compare this new value with the measured signal strength in cell C9. If cell C9 has a higher value of the signal strength as compared to cell C8 (signal strength+hysteresis HYST), a handover will be attempted. As referred to earlier, the handover parameters HYST and OFFSET are used at the assignment of a traffic channel to mobile station MS4 and the parameters are fetched from the parameter storing means in the radio network handling arrangement or in an MSC/BSC as discussed above. As can be seen, MS4 is here within the handover area between cells C8 and C9. If MS4 originates a call, cell C8 will be accessed, i.e. forms the access cell. Since MS4 is located in the load driven assignment area (LDA), i.e. the area allowing load controlled or load dependent assignment of traffic channels to one of the cells, between cells C8 and C9, the load of both cells C8 and C9 will be evaluated as discussed above with reference to FIGS. 1 and 2 respectively. In a particular implementation the traffic load in a cell is defined as the ratio of the number of busy traffic channels and the sum of busy traffic channels and idle traffic channels in the cell. It is supposed that the total number of traffic channels in cell C8 is 20 whereas the number of busy traffic channels is 12. The traffic load in cell C8, $L_{C8}$ will thus be 0.6. It is supposed that the number of total traffic channels in cell C9 is 20 whereas the number of busy traffic channels is 9. In a similar manner $L_{C9}$ will be 0.45. Thus the traffic load is higher in cell C8 than in cell C9.

Particularly, when counting busy and idle channels, a half rate traffic channel should be counted as 1, a full rate traffic channel on a dual rate equipment should be counted as 2 whereas a full rate traffic channel on a full rate only equipment should be counted as 1. Particularly the traffic load is defined for each cell controlled by the MSC (not shown) and the traffic load is advantageously evaluted at every allocation attempt in the cell, i.e. at every attempt of assigning a traffic channel, in one embodiment however excluding all handovers or handover attempts.

Thus, for the example as illustrated through FIG. 3, the load evaluation will indicate cell C9 for assignment of a traffic channel.

As referred to earlier the processing means using the algorithm for load based assignment as well as the load monitoring means measuring the load in each cell, advantageously continuously, are both located in the radio network part of the system, in the MSC or in the BSC. Particularly this is applicable also to the relevant cell parameters, e.g. the handover parameters HYST and OFFSET (as well as SSUFF and HYSUFF if applicable). Particularly the signal strength measurements are provided by the mobile station at call set-up for the access cell and some neighbouring cells to the MSC (BSC) or, according to the present invention, to the radio network handling arrangement.

According to the invention load dependent assignment can be performed in different ways. According to one implementation, calls that could be accepted in the neighbouring cell (using the cell assignment, e.g. the handover parameters as discussed above) shall be set-up in such an available neighbouring cell provided that such cell has a lower traffic load than the access cell. In another alternative embodiment predefined threshold levels are given for the traffic load in the cells. A call that would be accepted in a neighbouring cell should be set-up in such available neighbouring cell provided that a neighbouring cell has a traffic load that is lower than the predetermined threshold value or a so called "high traffic" level.

Figure 4:
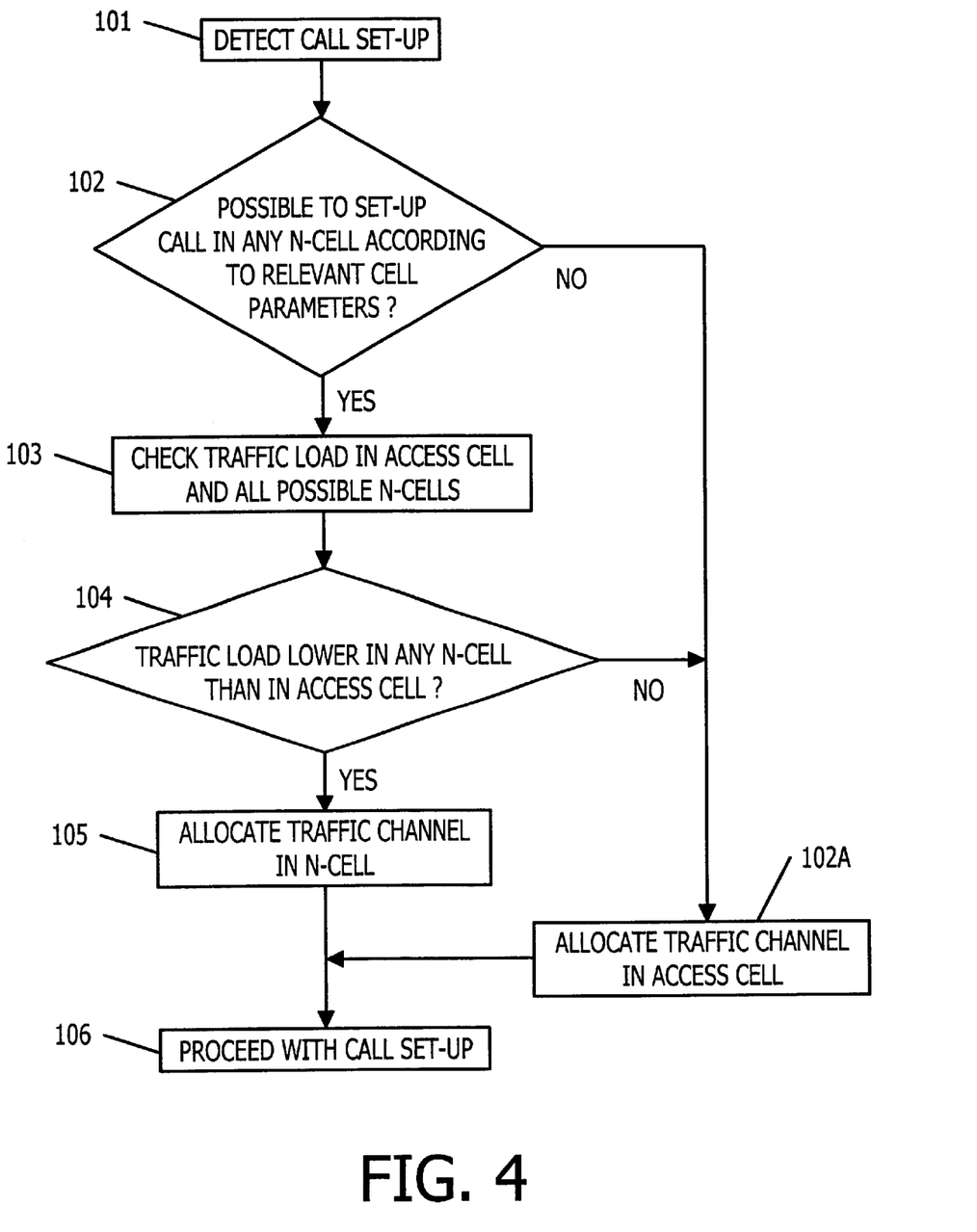
FIG. 4 is a flow diagram relating to the assignment of a traffic channel to a mobile station according to one embodiment of the invention.

Some embodiments will now be further discussed with reference to the flow diagrams of FIGS. 4 to 6.

One implementation of the inventive concept is schematically illustrated through the flow diagram of 4. First a call set-up request is detected, 101, which means that a mobile station having chosen a control channel is to be assigned a traffic channel. An examination is then performed to establish whether it is possible to set-up the call in any neighbouring cell, i.e. a cell which is a neighbour to the access cell which normally would have been used for the call set-up. This means that an examination is performed to see if there are any available neighbouring cells and particularly the handover parameters are used. More generally the relevant cell parameters are used, also called the cell assignment parameters, which particularly are the handover parameters. If, however, the result of the examination is that there is no neighbouring cell which is available as assignment candidate, then a traffic channel is allocated in the access cell itself, or in other words a traffic channel is assigned to the mobile station in the access cell if this is possible, 102A, which it generally is since the concept is based on preventing congestion from being produced.

If however it is established that a number of neighbouring cells, (n-cells) are available as assignment candidates, or at least one neighbouring cell, the traffic load is examined in the access cell as well as in all available neighbouring cells (N-CELLS), 103. Thereupon is examined whether the traffic load is lower in any of the neighbouring cells than in the access cell, 104. If it then is established that the traffic load is higher in the available neighbouring cells than in the access cell itself, a traffic channel is allocated in the access cell, 102A. If it however is established that there is a neighbouring cell having a traffic load which is lower than that in the access cell, a traffic channel is allocated in said neighbouring cell, 105. If there are more than one neighbouring cell having a traffic load that is lower than that in the access cell, the available neighbouring cell having the lowest traffic load is normally selected. However, also other criteria can be used to decide which of such cells is to be used for assigning a traffic channel to the mobile station. For layered structures it may in some cases be more attractive to use a lower layer even if the load is higher in such lower layer or in a cell within the same layer having a higher load.

When a traffic channel has been allocated, either in a neighbouring cell, 105, or in the access cell, 102A, is proceeded with the call set-up procedure, 106.

Figure 5:
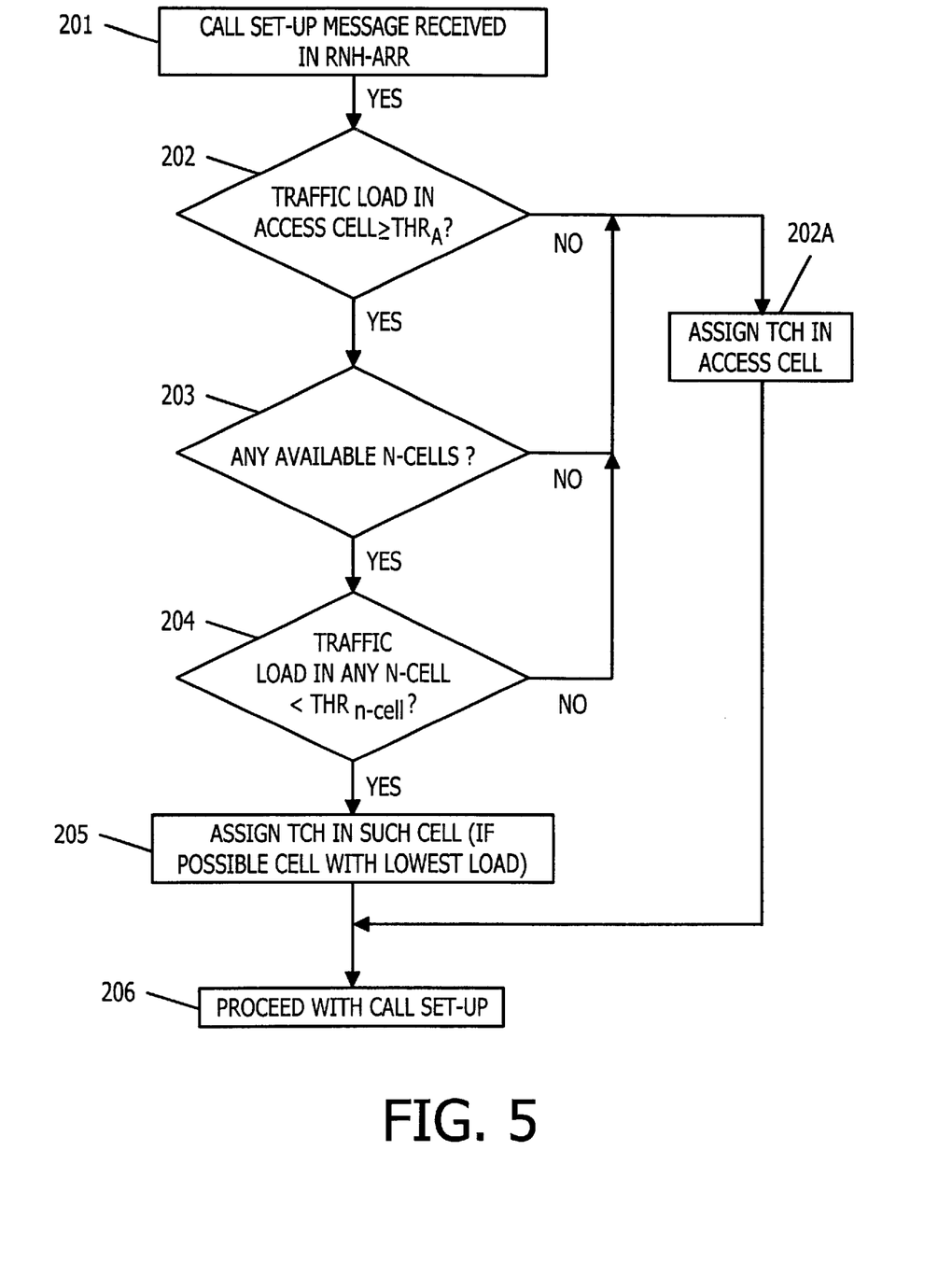
FIG. 5 is a flow diagram describing assignment of a traffic channel to a mobile station according to a second embodiment of the present invention.

FIG. 5 is a flow diagram schematically describing a somewhat different implementation of the inventive concept. First a call set-up is detected, or a call set-up message is received in the radio network handling arrangement, more generally in a mobile switching center or a base station controller, depending on which is the kind of cellular communication system, 201. It is then supposed that threshold values THR, have been given for at least a number of cells relating to the acceptable traffic load in the respective cells. They may be defined in different ways, or be the same for a number of cells, or be specifically cell related or defined in the terms of a relationship between two neighbouring cells etc. It is then examined whether the traffic load in the access cell exceeds or is equal to the threshold value as defined for said access cell, $THR_A$, 202. If not, a traffic channel is assigned in the access cell, 202A and it is proceeded with the call set-up procedure, 206. If on the other hand it is established that the traffic load in the access cell exceeds the threshold value $THR_A$, it is examined whether there are any available neighbouring cells, 203, wherein the same criteria may be used as discussed with reference to the preceding figures, using e.g. the handover parameters. If there are no available neighbouring cells it will be attempted to assign a traffic channel in the access cell, 202A.

An examination is then performed to see if the traffic load in any of the availabe neighbouring cells is lower than the threshold value of the respective neighbouring cell $THR_{n\text{-}cell}$. If however, the load in one or more neighbouring cells is lower than the respective threshold value, a traffic channel in such neighbouring cell is assigned, 205. Preferably, or according to a particular embodiment, the available neighbouring cell having the lowest traffic load is used for the assignment. However, as referred to above, other criterias may be implemented. Then is proceeded with the call set-up procedure, 206.

Figure 6:
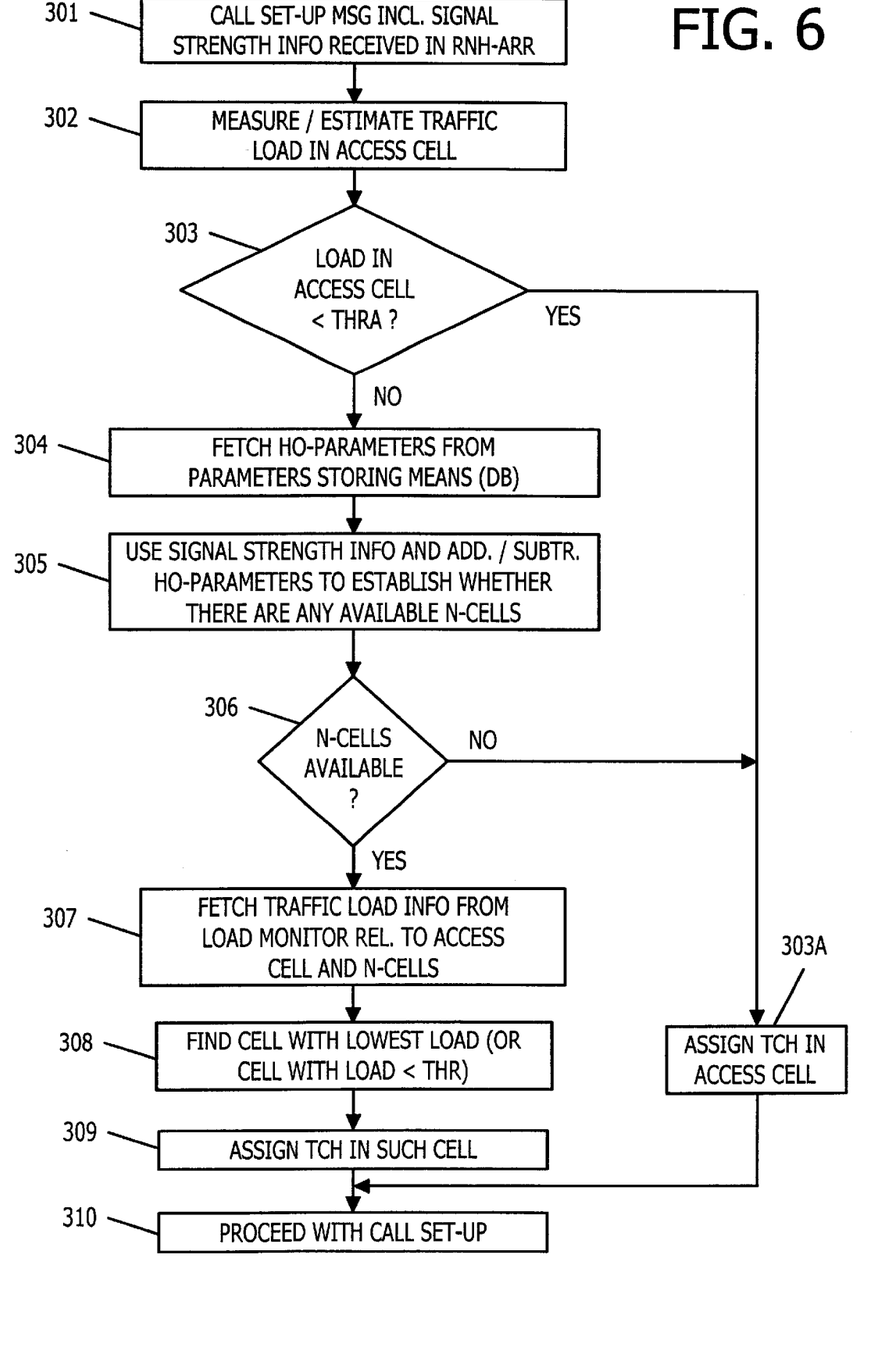
FIG. 6 is a flow diagram somewhat more thoroughly describing the assignment of a traffic channel according to one embodiment of the invention.

FIG. 6 is a flow diagram describing somewhat more in detail the assignment procedure according to one embodiment of the invention. As before, a call set-up message is received in the radio network handling arrangement, 301. The call set-up message includes signal strength information relating to a number of cells. The load in the access cell is then measured or estimated. If it is lower than the threshold value $THR_A$ for the access cell, 304, a traffic channel in the access cell is assigned, 303A, otherwise the relevant cell parameters, e.g. the parameters stored in the parameter storing means (DB) are fetched by processing means of the radio network handling arrangement, 304. The signal strength information is then used and the (handover) parameters are added to, or subtracted from, the signal strength values to establish whether there are any available neighbouring cells, 305. It is then settled whether there are any neighbouring cells available, 306, and if not, a traffic channel TCH in the access cell is assigned, 303A. It is then proceeded with the call set-up procedure, 310. If however it was established that there was at least one neighbouring cell available, the traffic load information is fetched from the load monitor relating to the traffic load in the access cell and the available neighbouring cells, 307. Then the cell having the lowest traffic load is found, 308. Alternatively simply a cell with a load lower than the relevant threshold value is found; this can be done in different ways. A traffic channel in such cell is then assigned, 309, and it is proceeded with the call set-up procedure, 310.

It should be clear that the invention is not limited to the particularly illustrated embodiments but that it can be varied in a number of ways within the scope of the appended claims.

It is among others an advantage of the invention that it will optimize the use of the configured capacity of the system. It is also an advantage that less calls will be disconnected due to lack of radio resources. It should be clear that the invention is active in preventing congestion situations from even being produced and enabling an even load distribution or a desirable load distribution among the cells.

What is claimed is:

1. An arrangement for handling radio communication in a number of cells that serve a number of mobile stations in a cellular communication network, in which a number of radio channels are assigned as control channels and traffic channels, the arrangement comprising:

means for assigning traffic channels;

means for storing cell parameter information including handover parameters;

means for holding signal strength information; and load monitoring means for holding information about traffic load in at least a number of cells;

wherein the traffic channel assigning means comprises means for using signal strength values and cell assignment parameters to establish if there are any neighboring cells available as cell candidates for a mobile station accessing an access cell, and traffic load information for the access cell and such available cells is used such that a mobile station accessing an access cell can be assigned a traffic channel in one of the available cells based on the traffic load in the cells; and wherein handover parameters are added to or subtracted from the signal strength values received from the mobile station in an initial access message provided to the access cell to establish whether the mobile station is in the handover area between the access cell and at least one neighboring cell, and if yes, the neighboring cell(s) form(s) (an) available cell candidate(s).

2. The arrangement of claim 1, wherein if a mobile station is in the handover area of a number of available neighboring cells, traffic load information contained in the load monitoring means is used to establish which of the cells among the access cell or any of the available neighboring cells has the lowest traffic load, and the mobile station is assigned a traffic channel in that cell.

3. The arrangement of claim 1, wherein a threshold value is given for the load in at least a number of cells, and if the traffic load exceeds the given threshold value in the access cell, the mobile station is assigned a traffic channel in an available neighboring cell having a traffic load that is lower than the threshold value of the cell.

4. The arrangement of claim 1, wherein the arrangement is included in a mobile switching center (MSC) of the cellular communication network.

5. The arrangement of claim 4, wherein the parameter storing means and/or the load monitoring means are arranged externally of, but in communication with, the MSC.

6. The arrangement of claim 1, wherein the arrangement is included a base station controller (BSC) of the cellular communication network.

7. The arrangement of claim 6, wherein the parameter storing means and/or the load monitoring means are arranged externally of, but in communication with, the BSC or in the BSC.

8. The arrangement of claim 1, wherein the cells of the cellular communication network are arranged in a hierarchical cell structure.

9. The arrangement of claim 8, wherein load based assignment to a neighboring cell is performed to set up calls in the lowest possible hierarchical layer, and if a mobile station is within the coverage of lower and higher layer cells, traffic load information is taken into consideration for both lower and higher layer cells.

10. The arrangement of claim 1, wherein load dependent assignment is used only for cells within the coverage area of an MSC or BSC.

11. The arrangement of claim 1, wherein load dependent assignment is implemented for cells irrespective of whether the cells belong to the same or to different MSCs or BSCs.

12. The arrangement of claim 11, wherein for assignment between cells belonging to different MSCs, processor loads in the MSCs are also used to decide whether a cell is available as a cell candidate.

13. An arrangement for handling radio communication in a number of cells that serve a number of mobile stations in a cellular communication network, in which a number of radio channels are assigned as control channels and traffic channels, the arrangement comprising:

means for assigning traffic channels;

means for storing cell parameter information;

means for holding signal strength information; and load monitoring means for holding information about traffic load in at least a number of cells;

wherein the traffic channel assigning means comprises means for using information about cell parameters and about signal strength measurements for a number of cells to establish if there are any neighboring cells available as cell candidates for a mobile station accessing an access cell, and traffic load information for the access cell and such available cells is used such that a mobile station accessing an access cell can be assigned a traffic channel in one of the available cells based on the traffic load in the cells; and wherein the traffic load of a cell is a number of busy traffic channels divided by a sum of a number of busy traffic channels and idle traffic channels in the cell, and the traffic load either is evaluated at every allocation attempt in the cell or is estimated.

14. The arrangement of claim 13, wherein the traffic load in at least a number of cells is evaluated continuously.

15. A cellular communication system, comprising a number of radio network handling arrangements, wherein each arrangement handles radio communication in a number of cells by radio channels assigned as control channels and traffic channels; each arrangement includes means for assigning traffic channels and means for storing cell parameter information; at least a number of the arrangements further comprise load monitoring means for collecting information about traffic load in at least a number of the cells served by the respective arrangements, and the traffic channel assigning means includes means, using cell parameter information and signal strength information, for establishing if there are any neighboring cells available as cell candidates for a mobile station accessing an access cell; and if it is established that a number of neighboring cells are available as cell candidates, traffic load information is used such that assignment of a traffic channel based on the load in the available cells can be performed for a mobile station accessing an access cell, wherein the cell parameter information storing means at least store information about cell parameters in the form of handover parameters, and information holding means are provided for holding and collecting information about the signal strength in a number of cells, the signal strength values and handover parameters being used to establish whether there are any neighboring cells available for a mobile station accessing an access cell and to establish which neighboring cells are available, and wherein a mobile station accessing an access cell provides an initial access message to the access cell and signal strength information is provided in the initial access message, the handover parameters being added and/or subtracted from the signal strength values to establish whether the mobile station is in the handover area between the access cell and at least one neighboring cell.

16. The cellular communication system of claim 15, wherein if a mobile station is in the handover area of a number of alternative neighboring cells, traffic load information contained in load information holding means is used to establish which of the cells among the access cell and any available neighboring cell candidate has the lowest traffic load, and the traffic assignment means of the relevant network handling arrangement assigns a traffic channel in such cell to the mobile station.

17. The cellular communication system of claim 15, wherein a threshold value is given for the load in a number of cells and if the traffic load exceeds the given threshold value in the access cell, the mobile station is assigned a traffic channel in an available neighboring cell having a traffic load that is lower than the threshold value of the cell.

18. The cellular communication system of claim 15, wherein the arrangements are included in mobile switching centers (MSCs) or base station controllers (BSCs), and the parameter storing means and/or load monitoring means are arranged separately but in communication with a number of radio network handling arrangements or provided in a respective radio network handling arrangement.

19. The cellular communication system of claim 15, wherein the cells of the cellular communication system are arranged in a hierarchical cell structure.

* * * * *